US006987443B2

(12) United States Patent
Lund

(10) Patent No.: US 6,987,443 B2
(45) Date of Patent: Jan. 17, 2006

(54) UNIFIED PAGING

(75) Inventor: Arnold M. Lund, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 412 days.

(21) Appl. No.: 09/940,767

(22) Filed: Aug. 27, 2001

(65) Prior Publication Data

US 2003/0038708 A1   Feb. 27, 2003

(51) Int. Cl.
   *H04Q 7/00*   (2006.01)
(52) U.S. Cl. .................. 340/7.23; 340/7.29; 340/7.52; 340/7.57
(58) Field of Classification Search ............... 340/7.23, 340/7.28, 7.22, 7.29, 7.52, 7.54, 7.53, 7.57; 379/88.1, 88.11, 88.12, 88.14, 88.15, 88.16, 379/88.17, 88.18, 88.19, 88.22
See application file for complete search history.

(56) References Cited

U.S. PATENT DOCUMENTS

| | | | |
|---|---|---|---|
| 4,072,824 A | 2/1978 | Phillips | |
| 4,490,579 A | 12/1984 | Godoshian | |
| 4,975,693 A | 12/1990 | Davis et al. | |
| 4,975,694 A | 12/1990 | McLaughlin et al. | |
| 5,099,507 A | 3/1992 | Mukai et al. | |
| 5,258,751 A * | 11/1993 | DeLuca et al. ............. | 340/7.52 |
| 5,278,546 A | 1/1994 | Weitzen et al. | |
| 5,280,516 A | 1/1994 | Jang | |
| 5,287,099 A | 2/1994 | Tsunoda | |
| 5,307,059 A | 4/1994 | Connary et al. | |
| 5,394,560 A | 2/1995 | Kane | |
| 5,471,204 A | 11/1995 | Kudoh et al. | |
| 5,504,476 A | 4/1996 | Marrs et al. | |
| 5,604,491 A | 2/1997 | Coonley et al. | |
| 5,703,570 A * | 12/1997 | Gorday et al. ............. | 340/7.22 |
| 5,726,642 A * | 3/1998 | Kudoh et al. ............... | 340/7.52 |
| 5,740,235 A | 4/1998 | Lester et al. | |
| 5,742,668 A * | 4/1998 | Pepe et al. ................ | 379/88.22 |
| 5,754,111 A | 5/1998 | Garcia | |
| 5,761,278 A | 6/1998 | Pickett et al. | |
| 5,815,081 A | 9/1998 | Motohashi | |
| 5,861,818 A * | 1/1999 | Ohtsuki ..................... | 340/7.52 |
| 5,870,549 A | 2/1999 | Bobo, II | |
| 5,936,547 A | 8/1999 | Lund | |
| 5,943,397 A | 8/1999 | Gabin et al. | |
| 5,969,636 A | 10/1999 | Parvulescu et al. | |
| 5,974,300 A * | 10/1999 | LaPorta et al. ............ | 340/7.23 |
| 6,040,784 A | 3/2000 | Miller | |
| 6,055,240 A | 4/2000 | Tunnicliffe | |
| 6,061,570 A * | 5/2000 | Janow ....................... | 340/7.29 |
| 6,188,907 B1 | 2/2001 | Reding et al. | |
| 6,215,413 B1 | 4/2001 | Gaskill | |
| 6,317,485 B1 * | 11/2001 | Homan et al. ........... | 379/88.12 |

* cited by examiner

*Primary Examiner*—Brian Zimmerman
*Assistant Examiner*—Clara Yang
(74) *Attorney, Agent, or Firm*—Townsend and Townsend and Crew LLP

(57) ABSTRACT

In one embodiment, a method for paging from a pagor to a pager is disclosed. In one step, a page is sent wirelessly to the pager and received from the pagor. After determining that the pagee has not responded to the page for a predetermined time period, the page is converted to a message and a message-waiting indicator is activated.

19 Claims, 6 Drawing Sheets

UNIFIED PAGING

BACKGROUND OF THE INVENTION

This invention relates in general to paging systems and, more specifically, to a method for wirelessly paging with a unified messaging system.

Current paging systems transmit a call from a telephone at the originating end through a wireless connection to a pager or receiver device at the terminating end. Some pagers have a digital readout that provides the calling number while others have an alpha-numeric that provide both the calling number and a short text message. In terms of notification, some pagers use vibration, an audible tone, and/or message waiting indicators (e.g., a light or LED) in addition to the visual notification on the digital readout.

One problem with the current paging systems is the inability of a user to establish and customize the alert notifications that indicate that a page has been received. Currently, a user is only able to establish how frequently (e.g., immediately, 1, 2, 4 or 24 hours) they will be notified by a page of a new message.

Paging systems have an inability to sort or filter pages that have been received. Once a page has been transmitted to the pager, the page is placed into a cue based on date and time received. The same cueing process applies for pages that have been reviewed whereby the pages are arranged in the order of date and time received.

It would be beneficial for individuals to be able have more control over the sending and receiving of information using pagers. Current applications have limited flexibility to control the signaling mechanisms and the filtering of the message content.

BRIEF DESCRIPTION OF THE DRAWINGS

The present invention is described in conjunction with the appended figures.

In the appended figures, similar components and/or features may have the same reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides a method for sending and retrieving a page sent from a pagor to a pagee (i.e., from a page sender to a page receiver). Under some circumstances a page is converted to a message and stored in a unified messaging system along with a pre-set message that is associated with the page. A criterion for activation of one or more message waiting indicators is pre-established and stored in the unified messaging system. After there is no response to a page for a predetermined period of time, the unified messaging system activates the message indicators if the page matches a pre-defined criterion. That criterion may be based upon caller I.D. information associated with the page (e.g., the name and telephone number of the pagor).

The criterion is used to identify pages or classes of pages for the purpose of activating notification signals (e.g., turn flags on or off) on the pager device and/or attach pre-formulated messages to a page stored in the unified messaging system. This criterion is pre-established by the originator to provides the ability to control the pages. The criterion could be applied in the unified message system or in a new circuit that is located within the pager or the cellular/wireless/wired telephone.

Figure 1:
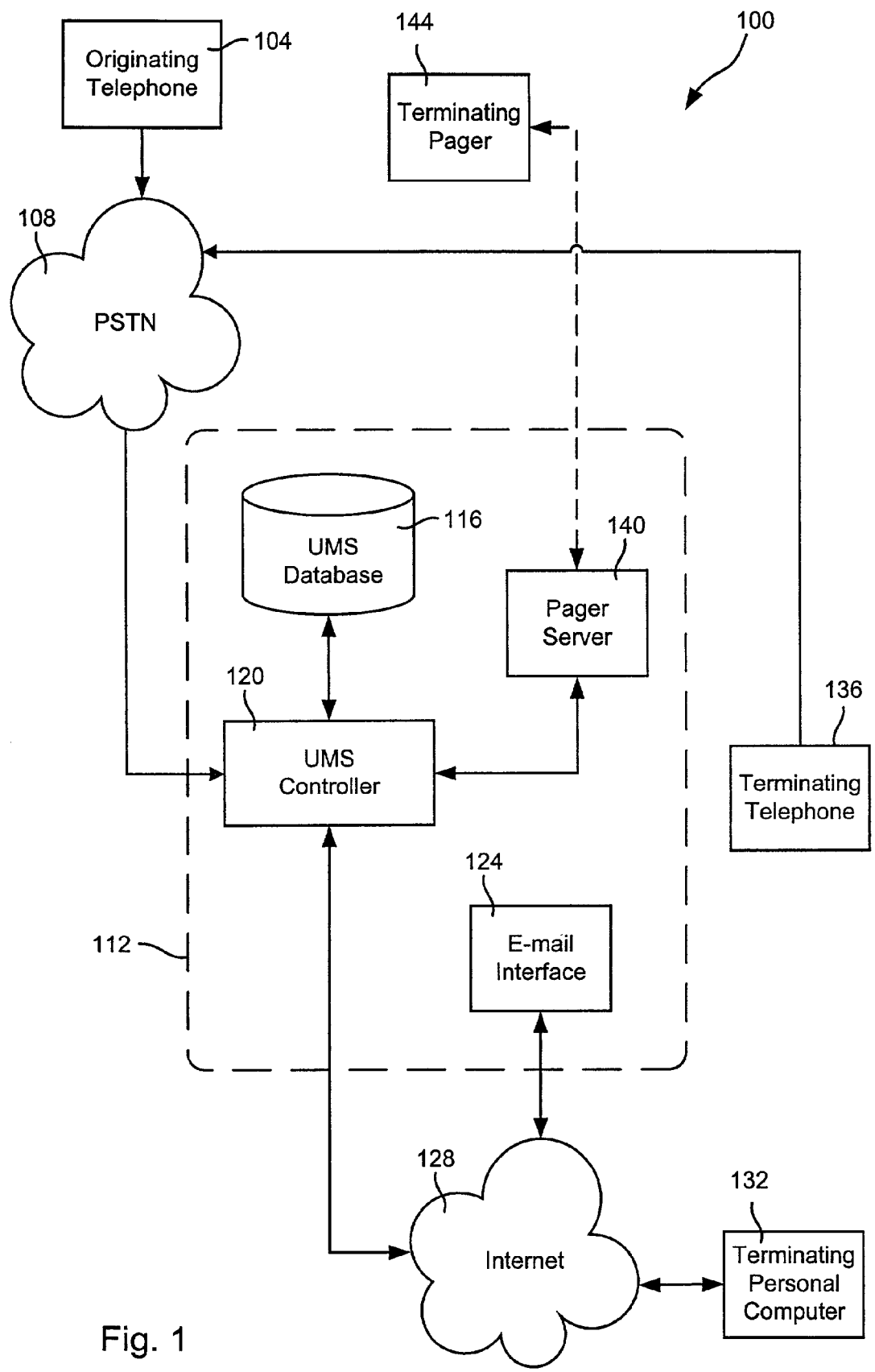
FIG. 1 is a block diagram of an embodiment of a paging system having a unified message system (UMS)

Referring to FIG. 1, a block diagram of an embodiment of a paging system 100 using a unified message system 112 is shown. In this embodiment, an originating telephone 104 goes through a Public Switched Telephone Network (PSTN) 108 to connect with a unified messaging system (UMS) 112 in order to send a page or other message to the terminating end.

The originating telephone 104 can consist of at least one or more telephone devices that are available to connect through the PSTN 108 to the unified message system 112. The originating telephone 104 can be a standard telephone, a voice over Internet protocol (VOIP) system, an analog or digital phone, a wireless telephone, a cordless telephone, or a cellular telephone. In some embodiments, the originating telephone 104 could be a two-way pager, WAP enabled device, or a computer using a web interface capable of sending a page. In one embodiment, a hard wire network interface is used to connect the originating telephone 104 to the PSTN 108. In an alternative embodiments, different network interfaces can be used depending upon the communication technologies utilized by the originating telephone 104 (e.g. cellular or VOIP).

The PSTN 108 enables communications between the originating telephone 104 and one or more communication devices 132, 136, 144 located at the terminating end by way of the UMS 112. The PSTN 108 can include such technologies as packet or circuit switching, UHF, carrier current, microwave, wireless, fiber optics, cable, and/or satellite communication. The PSTN 108 interacts with a UMS controller 120 to provide the status of the phone line, such as ring, dial tone, open or occupied line, to attach signaling system 7 (SS7) information and to make a telephone connection.

The UMS provides messaging capabilities to the terminating user. These capabilities could include voice mail, paging, e-mail, video messaging, etc. The UMS 112, after no response for a predetermined amount of time to a page, converts the page to a message and activates one or more message waiting indicators based on matching criterion information to the received page. The UMS provides messages to a terminating telephone 136, a terminating pager 144 and/or a terminating personal computer (PC) 132 which are collectively referred to as the communication devices 132, 136, 144 at the terminating end. Within this embodiment of the UMS 112 are a UMS controller 120, a UMS database 116, a pager server 140, and an e-mail interface 124. These modules may be implemented in any number of electronic systems divided in any number of ways and interconnected by networks in any number of ways such that the modules may be in any number of different physical locations.

The UMS controller 120 runs software and/or firmware to manage the distribution of both message waiting indicators and pre-set messages to the one or more communication devices at the terminating end 132, 136, 144. The UMS controller 120 interacts with a UMS database 116 to correlate any received SS7 information using pre-established criterion stored therein, retrieve any pre-formulated messages capable of association with a page, and attempt to establish a connection with one or more of the specified communication devices at the terminating end 132, 136, 144. The criterion can relate to caller identification or other SS7 information including contact name (in whole or part), phone number (in whole or part), status and/or features of the originating telephone 104, and number accessibility (e.g. unlisted number or blocked caller).

The UMS database 116 stores the pages received, converted messages, pre-formulated messages, e-mail messages, communication modes of the pagee, communication modes of the pagor, the criteria and other information for the UMS 112. The communication modes of the pagor and pagee could include any access codes, telephone numbers, web sites, and e-mail addresses associated with contacting the pagor or pagee. The pre-formulated messages can be pre-recorded digitized sound and/or a pre-formulated alphanumeric message. Some embodiments may divide the data in the UMS database 116 into any number of databases or could include all the data as part of a larger database.

The pager server 140 sends pages to the terminating pager 144 and activates the message waiting indicator(s) for the terminating pager 144. The transmission of any message waiting indicators could include visual (e.g.: one or more lights in one or more colors), sensory (e.g.: pulses of different duration or intensities), and/or auditory (e.g.: use of different tones of different duration) notification signals. The pages can be merely phone numbers, alphanumeric messages or an indication to call the UMS. The pager server 140 includes the wireless equipment to communicate with the pager 144. In some embodiments, the pager server 140 can be integrated into a wireless telephone system that has the ability to page wireless handsets. The pager server 140 is capable of two-way paging.

The terminating pager 144 receives messages sent by the pagor. Through wireless communication, the terminating pager 114 sends and receives messages. The message could be a simple message waiting indicator, a telephone number entered by the pagor, a text message entered by the pagor, or a pre-defined message selected by the pagor. In some cases, the terminating pager 144 is a module integrated into another device such a wireless telephone, personal digital assistant (PDA), etc.

Pages can include pre-formulated messages and can be converted by the UMS controller for sending to the terminating telephone 136 or other destinations. For sending a message to the terminating telephone 136, the transmission of any message waiting indicators could include visual (e.g.: one or more lights in one or more colors) and/or auditory (e.g.: use of different tones of different duration) notification signals, depending upon the functional capabilities of the terminating telephone 136. Should the pagee decide to return the message, a call is placed through the PSTN 108. In some cases, the pagee may call back to the UMS 112 to return the call or may directly call the pagor.

Another distribution path of a converted page is from the UMS controller 120 through the Internet 128 and an e-mail interface 124 to the terminating personal computer 132. For this path, the transmission of any message waiting indicators could include the display of an icon on the screen of the terminating personal computer 132, the transmission of an e-mail message, and/or the emission of an audible sound from the speakers of the terminating personal computer 132. The e-mail could include the converted page message and could attach any digitized message. In some embodiments, the e-mail interface 124 could be a web page viewed through a web browser.

Figure 2:
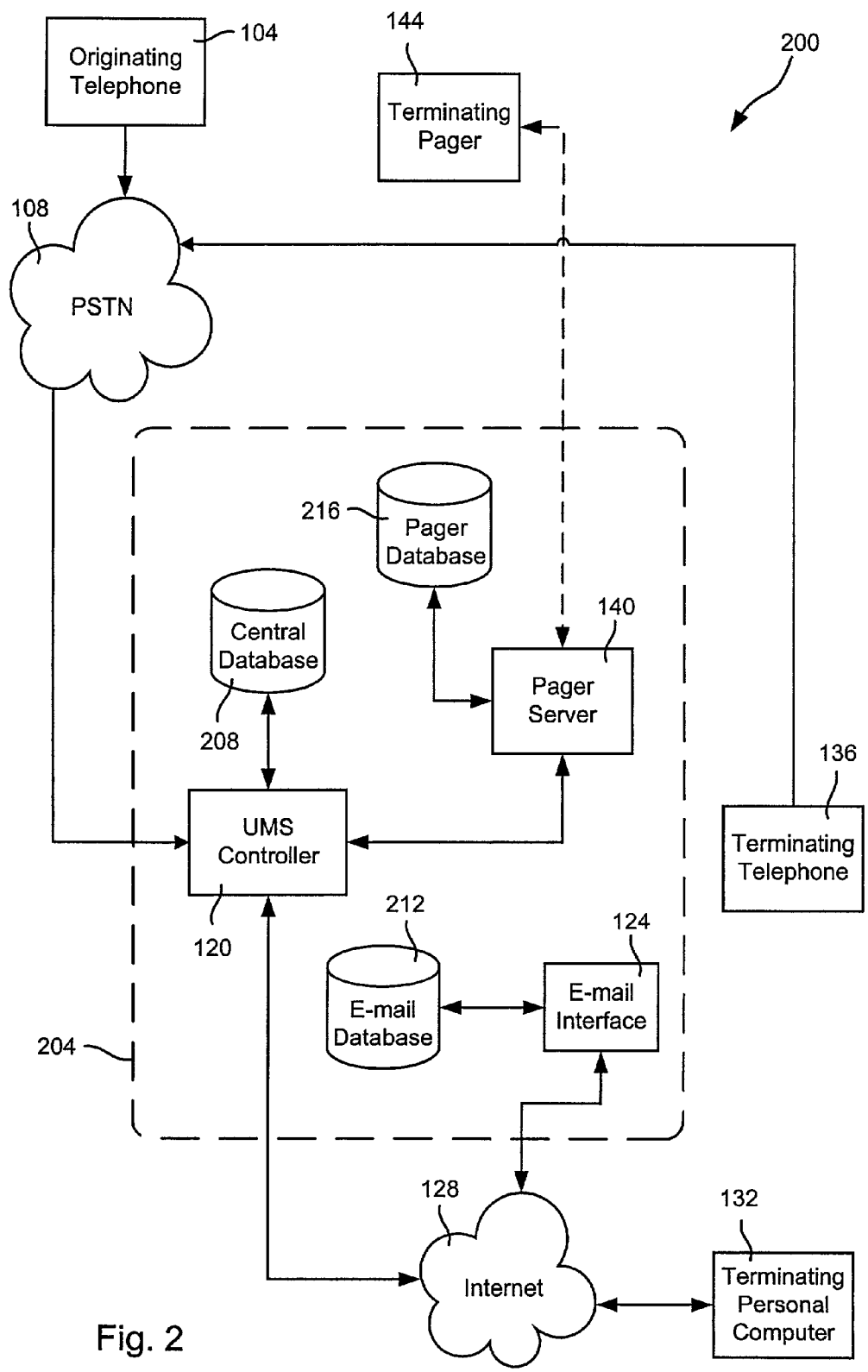
FIG. 2 is a block diagram of another embodiment of the paging system.

Referring to FIG. 2, a block diagram of another embodiment of a paging system 200 using a unified message system 204 is shown. In this embodiment, some of the information in the UMS database 116 is spread among a central database 208, a pager database 216 and an e-mail database 124. In terms of location, the e-mail database 212 is located off the e-mail interface 124, the pager database 216 is located off the pager server 140 and the central database is located off the UMS controller 120. Other embodiments may locate these databases 208, 212, 216 in other locations that are coupled by a network.

The various databases 208, 212, 216 store information such as the pages received, converted messages, pre-formulated messages, e-mail messages, communication modes of the pagee, communication modes of the pagor, the criteria and other information for the UMS 204. The central database 208 stores the converted messages, pre-formulated messages, communication modes, criteria, etc. The pager database 216 stores pages received along with any associated pre-formulated messages and message waiting indicator information. The e-mail database 212 stores e-mail messages that may include pre-formulated messages and message waiting indicator information. Those skilled in the art appreciate that these database may also store additional information inherent to the system 200.

Figure 3:
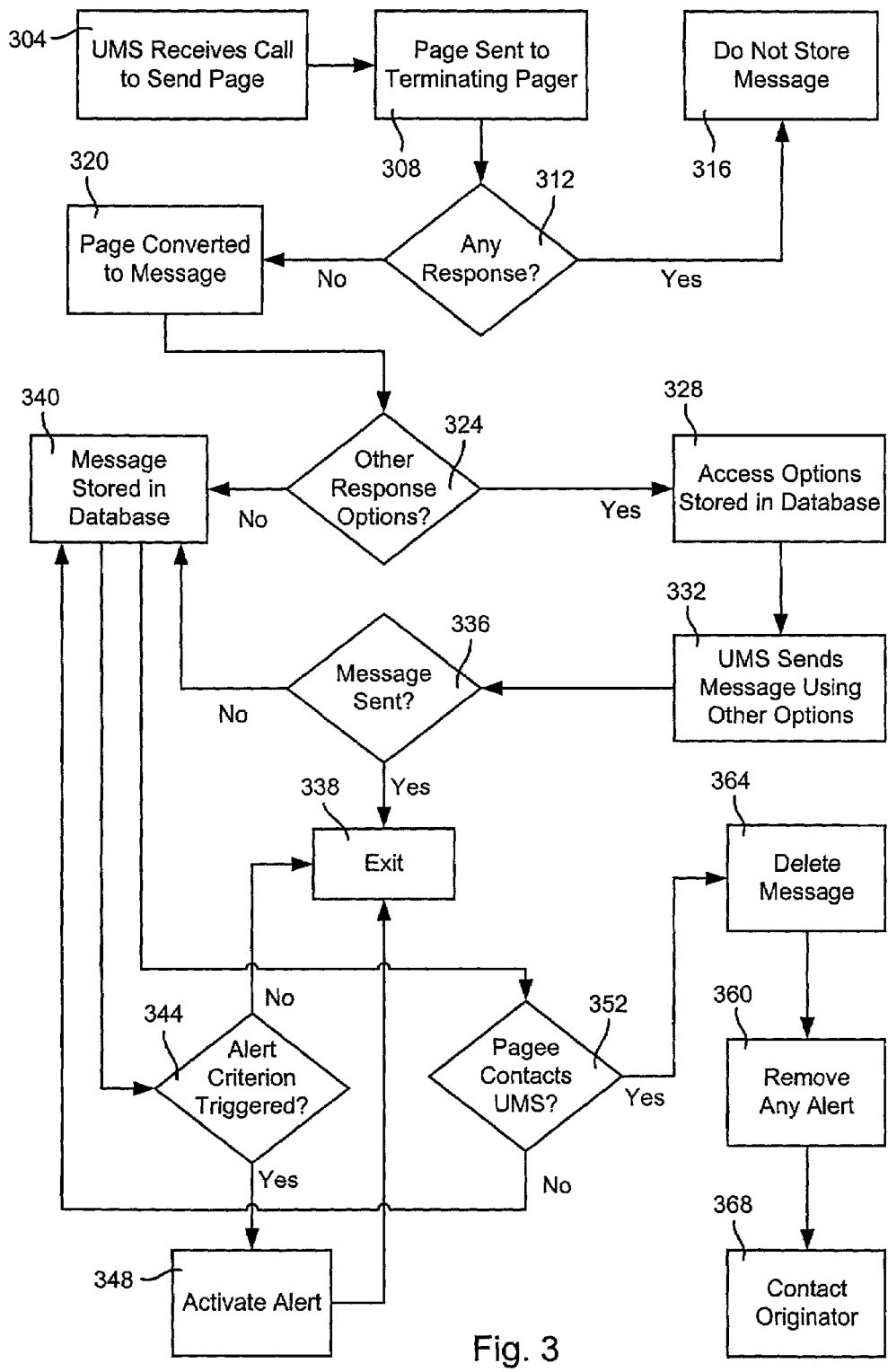
FIG. 3 is a flow diagram of an embodiment of a process for interacting with the UMS.

Referring to FIG. 3, a flow diagram of an embodiment of a process for interacting with the unified message system is shown. In this embodiment, the hardware of FIG. 1 is utilized. The flow diagram begins with step 304 whereby the UMS 112 receives a call from a pagor wishing to send out a page. Step 308 continues with the page being wirelessly sent by the pager server to the terminating pager. In step 312, it is determined if the page is returned within a predetermined amount of time, such as ten minutes. The pagee would return the page by calling into the UMS 112. If the page is responded to within the time constraints, the page is not stored into the UMS database 116 in step 316. If no response to the page is received within the predetermined amount of time, step 320 follows with the conversion of the page to a message and stored in the UMS database 116 in a communication mode agnostic format.

Step 324 continues with a search of the UMS database 116 to determine if any other communication options besides the pager 144 (e.g.: telephone, e-mail, etc.) are available to send the message to the pagee. If no other response options are available, in step 340 the message is stored in the UMS database 116 until the UMS 112 is accessed by pagee or deleted based on pre-established criterion. If other communication options are available to respond to the page, the UMS database 116 is accessed in step 328 to retrieve the stored communication options for the pagee. The UMS 112 continues the attempt to contact the pagee by sending the message using the other communication options in step 332.

For example, a call may be placed to the terminating telephone 136 to deliver the message using a voice synthesizer, or an e-mail may be sent to the terminating personal computer 132 with the message. If a connection to the pagee is not established as determined in step 336, the message is stored into the UMS database 116 in step 340 for retrieval over the phone. Alternatively in step 336, the message delivery process is complete if the message is sent by another communication mode.

From step 340, step 344 continues with the determination of whether or not the alert criterion was triggered. If the criterion found in the UMS database 116 was triggered in step 344, step 348 proceeds by activating the visual, auditory or vibration alert. If the alert criterion was not triggered in step 344, processing is complete for this message.

Another possible exit from step 340 involves the pagee retrieving one or more messages from the UMS 112. In step 352, the pagee contacts the UMS to retrieve messages. The pagee can contact the UMS by way of the terminating telephone 136 using touch-tones and voice synthesized prompts or by way of the terminating personal computer 132 using a web interface. Messages are reviewed and then deleted (or saved) in step 364. Once reviewed, the alerts associated with the messages are removed in step 360. The alert status is relayed to the pager server 140 and e-mail interface 124.

The UMS can respond to any message by connecting the pagee to the pagor. Stored in the UMS database 116 may be communication modes for the pagor. For example, the call-back number entered as part of the page is stored. Voice recognition, touch tones and/or web interface input is used to send a response to the pagor. For example, the pagee may listen to a voice message entered by the pagor and be prompted to return the message by dialing a number entered by the pagor. The pagee could be automatically connected to the pagor without having to hang-up and dial that number in a new phone call. In an alternative example, the pagee could speak a message into a voice recognition function that is sent as an alphanumeric page or e-mail back to the original pagor.

Figure 4A:
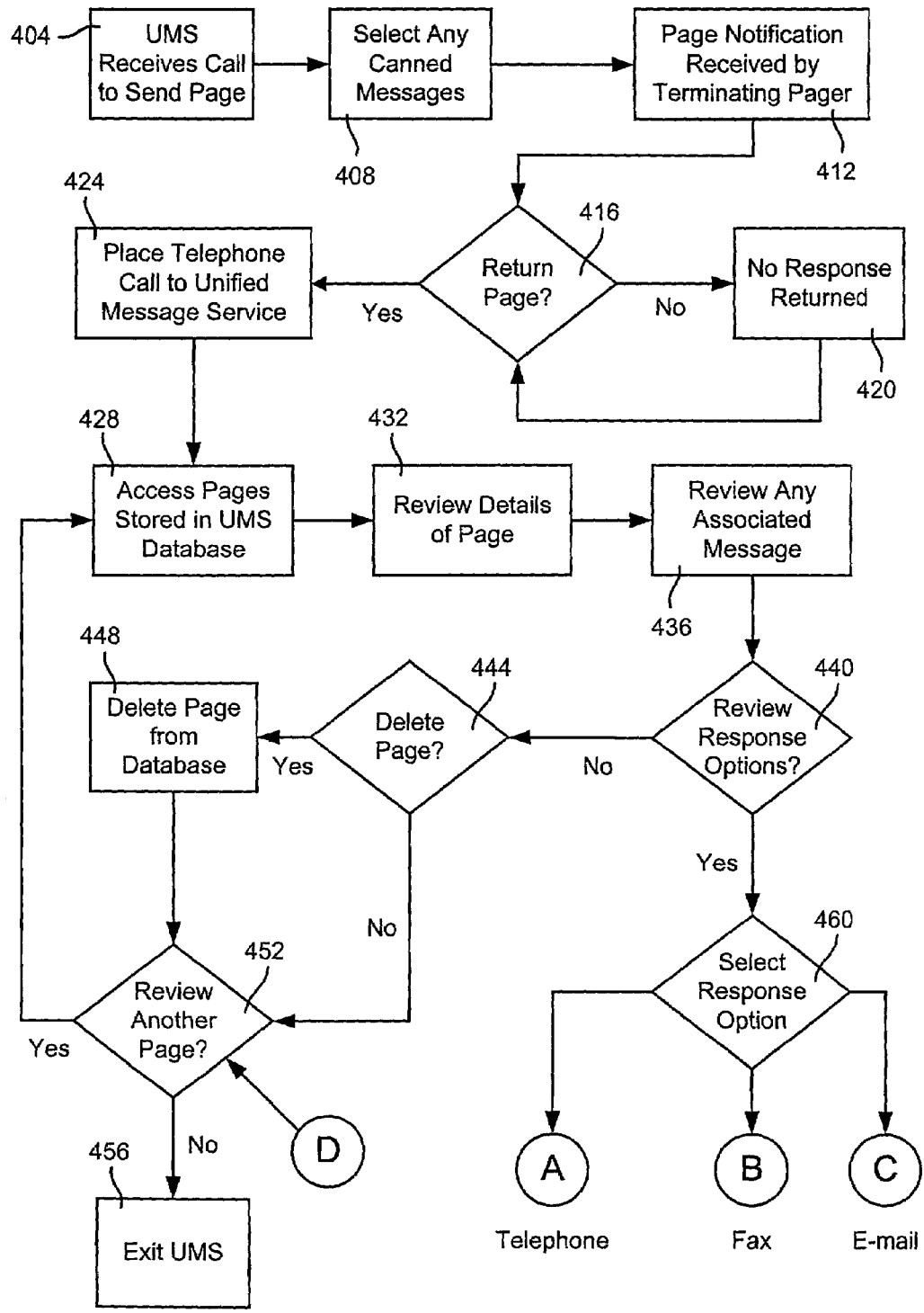
FIGS. 4A and 4B are a flow diagram of an embodiment of a process for receiving and returning a page using the UMS.

Referring next to FIG. 4A, a flow diagram of an embodiment of a process for interacting with the UMS 112 is shown. In this embodiment, the depicted portion of the process begins in step 404 when the UMS 112 receives a call from the pagor to send a page. The pagor enters a return telephone number or other information that will allow the pagee to return the page. In step 408, the pagor has the option to select any pre-formulated messages to attach to the page. In some embodiments, the pagor could enter a custom message using the touch-tone keypad or voice recognition. Step 412 follows with the receipt of a page notification by the terminating pager 144. In step 416, the pagee decides if the UMS page should be returned or ignored. If the pagee decides not to return the page in step 416, the pagor receives no returned response for the time being in step 420. Alternatively, a telephone call is placed by the pagee to the UMS 112 in step 428 if the pagee desires to return the page in step 416. When a connection with the IJMS 112 is established, the pagee will review the details of the page in step 432 as well as any pre-formulated or custom message associated with the page in step 436. The connection to the UMS 112 can be through a web interface or a telephonic interface.

Step 440 continues with the pagee being given the choice to review response options, if any, are available for contacting the pagor. At some point or as part of sending the page, the pagor enters communication modes available for returning a page, such as e-mail address(es), phone numbers and/or fax numbers. If no response options are available or the pagee does not want to review the response options in step 440, the pagee is given the choice to delete the page in step 444. Where the page is not deleted another page can be reviewed in step 452 or the connection to the UMS 112 can be terminated in step 456. Alternatively, the page can be deleted in step 448 before reviewing another page in step 452 or exiting the UMS 112 in step 456. Pages that are not deleted may be automatically deleted after a period of time or stored indefinitely.

Returning to step 440, an affirmative decision to review other communication response options leads to step 460 wherein the pagee will select one or more communication modes for returning the page. For the purpose of clarity and illustrating the continuation of the flow diagram onto FIG. 4B, the telephone, fax and e-mail communication mode processes are respectively represented by the A, B and C symbols. Regardless of the communication mode chosen to return the page with in step 460, processing continues in step FIG. 4B.

Figure 4B:
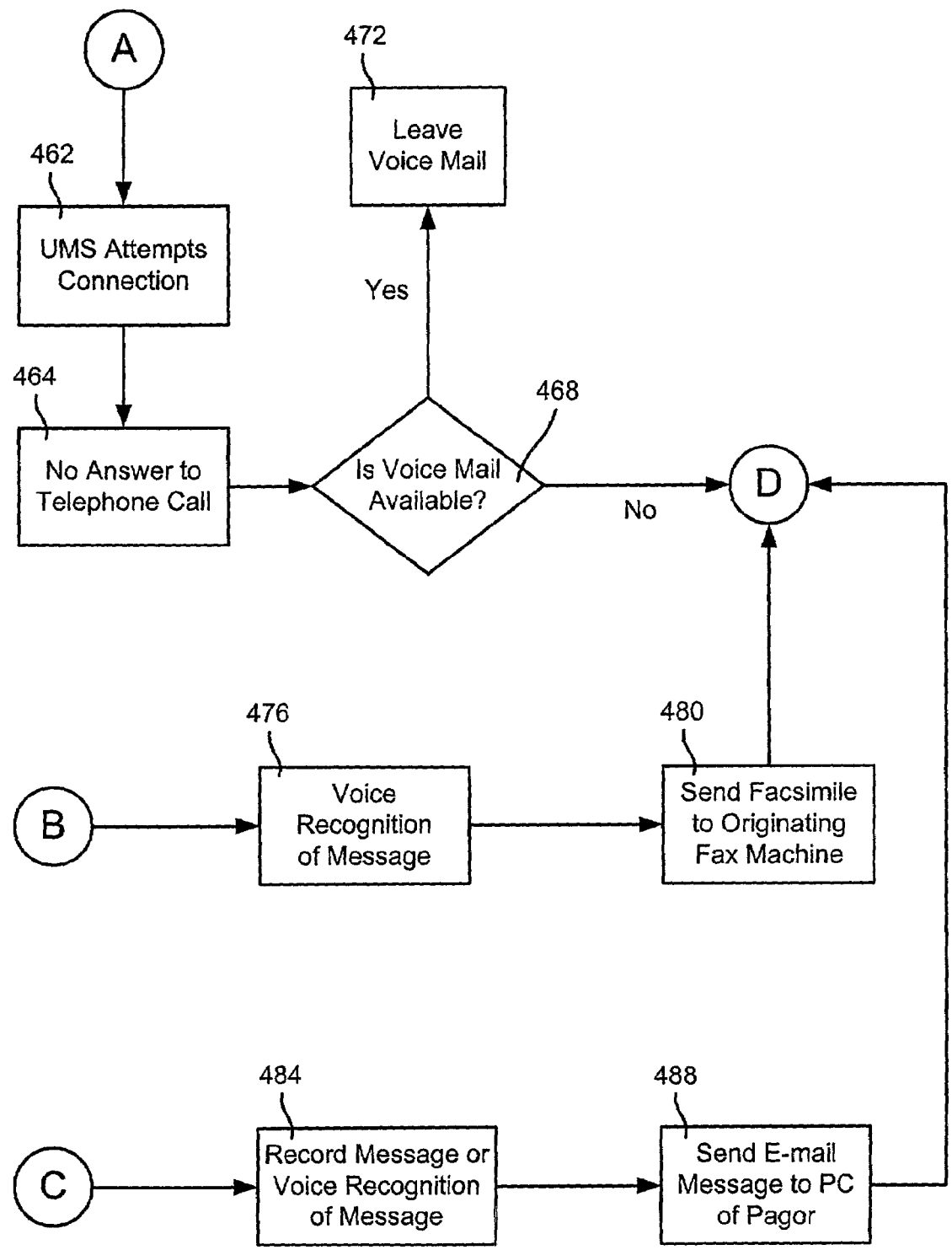

Referring to FIG. 4B, a continuation of the flow diagram of FIG. 4A is shown. In this embodiment, the A symbol from FIG. 4A, proceeds to step 462 where the UMS 112 attempts a telephone connection to the originating telephone 104 corresponding to the number left in the page by the pagor. In this embodiment, the pagor is unavailable such that the telephone call by way of the UMS 112 is unanswered in step 464. If voicemail is available in step 468 a message is left in step 472. Otherwise, processing continues back to step 452 of FIG. 4A denoted by the D symbol. In other examples, the pagor could be available such that after a conversation between the pagor and pagee processing continues to step 452.

The B symbol denotes a process flow from step 460 of FIG. 4A to step 476 corresponding to responding with a fax. The pagee speaks a message into the UMS 112 that converts the message to text using a voice recognition system within the UMS controller 120. Once the spoken message is converted in step 476 to a format that is suitable for sending a facsimile, the converted message is sent in step 480 to a facsimile machine number provided by the pagor. After step 480, processing continues back to step 452 of FIG. 4A denoted by the D symbol.

The C symbol denotes a process flow from step 460 of FIG. 4A to step 484 where the pagee's spoken message is converted into to a text format using a voice recognition system or is digitized into a sound file. Once step 484 is completed, the UMS can send out the email message to the personal computer of the pagor in step 488. Again, processing continues back to step 452 of FIG. 4A denoted by the D symbol after step 488.

Figure 5:
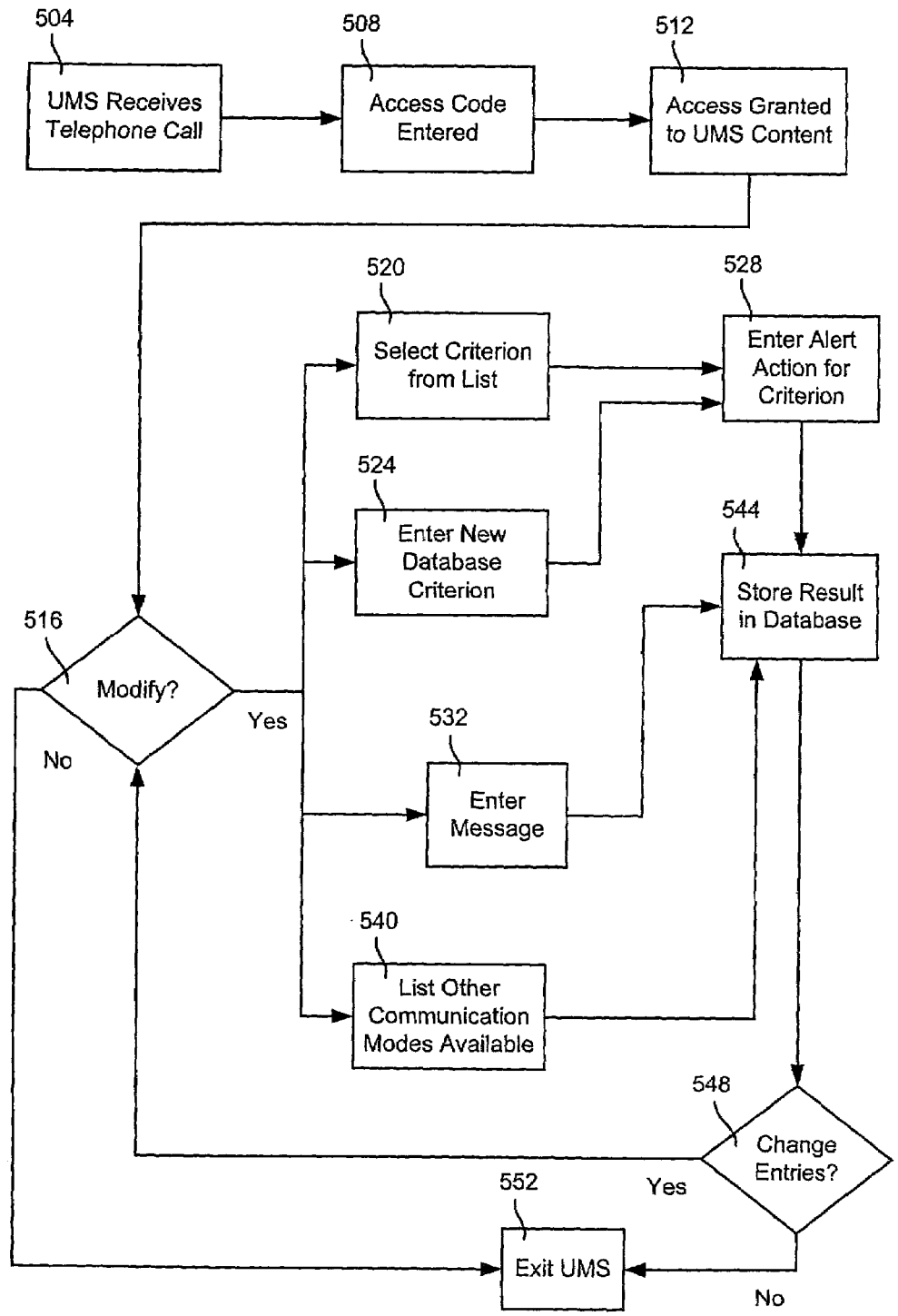
FIG. 5 is a flow diagram of an embodiment of a process for modifying the messages and/or criterion stored in the paging system.

Referring to FIG. 5, a flow diagram of an embodiment of a process for modifying the messages and/or criterion stored in the paging system is shown. The purpose of this flow diagram is to show the ability of both the pagee and pagor to customize the UMS in terms of UMS database 116 content (e.g., customize the canned messages, stored criterion, available communication modes, message alert mechanisms, etc.). In this embodiment, the hardware of FIG. 1 is utilized, but those skilled in the art can realize that other embodiments can alternatively be used.

Referring first to step 504, the UMS 112 receives a telephone call from a pagee or pagor. In step 508, the caller enters an access code and, if accepted, is granted access to the UMS 112 content in step 512. The decision to modify the database content of the UMS 112 occurs in step 516. If in step 516, no modification is desired the flow proceeds to step 552 in which the UMS 112 is exited.

An affirmative decision to modify the UMS content in step 516 results in the ability to modify one or more of the UMS database 116 elements. Selection of one or more of these elements may occur by using the keypad on the originating telephone 104 to select from a menu of corresponding elements including an existing database criterion, a new database criterion, pre-formulated messages, and communication modes. In step 520, the pagee or pagor can select the existing database criterion for activation. Such existing criterion could include algorithms based on caller I.D. information, personal identification number (PIN) codes, voice prints, date received, alert messages, etc. The list of pre-formulated criteria can be added to in step 524.

To enter a new database criterion, step 524 is selected to modify the UMS database 116 information. The pagee or pagor can enter new criterion that is added to the list of existing criterion after it has been stored in the UMS database 116. Once the new or existing database criterion has been selected in steps 524 and 520 respectively, the pagee or pagor can enter the desired alert action in step 528. For example, one of the existing criteria on the list could be to activate an alert when the page is requesting call-back to a long distance number. The criterion for the alert is stored in step 544.

Entering messages in step 532 is another selection possible if the pagee or pagor wants to modify the content of the UMS database 116 in step 516. After entry, these messages can be selected by the pagor to attach the page. For example, one of the messages could be "urgent." The pagor could attach "urgent" to a message to indicate its gravity.

Yet another selection possible if the pagee or pagor wants to modify the content of the UMS database 116 in step 516 is to list other communication modes available in step 540. The pagee or pagor may enter fax numbers, telephone numbers, and/or e-mail addresses. Further, the pagee or pagor may specify the order in which the communication modes should be tried. Once completed, the result is stored into the database in step 544.

Step 544 proceeds to step 548 in which the pagee or pagor is given the option to change entries within the UMS database 116. If an affirmative decision is made in step 548, the flow returns to step 516 such that the pagee or pagor can decide to modify the database content of the UMS 112. If a negative decision is made in step 548, the flow proceeds to step 552 in which the UMS 112 is exited. Although the above embodiment uses a telephone interface to modify the UMS database 116, other embodiments could use a web interface to perform the process outlined above.

A number of variations and modifications of the invention can also be used. For example, there could be any number of communication modes supported by the paging system. When a particular communication mode failed to reach the pagee or pagor, another communication mode could be used if it were specified to the UMS.

While the principles of the invention have been described above in connection with specific apparatuses and methods, it is to be clearly understood that this description is made only by way of example and not as limitation on the scope of the invention.

What is claimed is:

1. A method for paging from a pagor to a pager, where the pager is associated with a pagee, the method comprising steps of:
   receiving one or more alert criterion from one or more of the pagor and the pagee;
   sending a page wirelessly to the pager;
   determining the pagee has not responded to the page for a predetermined time period;
   determining at least one of the alert criterion is satisfied; and
   upon the determining the pagee has not responded and the at least one alert criterion is satisfied, converting the page to a message in a communication mode agnostic format, storing the message, and activating a message-waiting indicator associated with the pager.

2. The method for paging from the pagor to the pager as recited in claim 1, wherein the message is stored remote to the pager.

3. The method for paging from the pagor to the pager as recited in claim 1, wherein the converting step comprises a step of converting the page to the message with a unified messaging system that stores messages associated with devices other than pagers.

4. The method for paging from the pagor to the pager as recited in claim 1, further comprising a step of receiving a selection from the pagor of at least one of a plurality of predetermined messages to associate with the page.

5. The method for paging from the pagor to the pager as recited in claim 1, further comprising a step of storing information relating to one or more communication modes for the pagor that the pagee can use when returning the page.

6. A computer-readable medium having computer-executable instructions for performing the computer-implementable method for paging from the pagor to the pager as recited in claim 1.

7. The method of claim 1, wherein automatically activating the message-waiting indicator comprises activating one of a light indicator or a sensory indicator associated with the pagor.

8. The method of claim 1, wherein at least one of the alert criterion is based upon caller I.D. information associated with the page.

9. A method for paging from a pagor at a first location to a pager, where the pager is associated with a pagee, the method comprising steps of:
   storing information relating to a communication mode for the pagor that the pagee can use when returning the page;
   sending a page wirelessly to the pager at a second location;
   waiting until a predetermined time period has expired without the pagee responding to the page;
   converting the page to a message away from the second location;
   upon expiration of the predetermined time period, activating a message-waiting indicator associated with the pager;
   receiving a voice message from the pagee;
   converting the voice message to a second format;
   transmitting the message in the second format to the pagor;
   wherein the second format comprises a text format; and
   wherein transmitting the message to the pagor comprises transmitting an e-mail.

10. The method for paging from the pagor to the pager as recited in claim 9, wherein the converting step comprises a step of converting the page to the message with a unified messaging system that stores messages associated with devices other than pagers.

11. The method for paging from the pagor to the pager as recited in claim 9, further comprising a step of receiving a selection from the pagor of at least one of a plurality of predetermined messages to associate with the page.

12. The method for paging from the pagor to the pager as recited in claim 9, further comprising a step of storing information relating to a plurality of communication modes for the pagor that the pagee can use when returning the page.

13. A computer-readable medium having computer-executable instructions for performing the computer-implementable method for paging from the pagor to the pager as recited in claim 9.

14. The method of claim 9, wherein activating the message-waiting indicator comprises activating one of a light indicator, a sensory indicator, or an auditory indicator.

15. A method for paging from a pagor to a pager, where the pager is associated with a pagee, the method comprising steps of:
   receiving a first alert criterion from one of the pagor or the pagee;
   receiving a second alert criterion from one of the pagor or the pagee;
   receiving a page from the pagor at a first location;
   receiving a selection from the pagor of at least one of a plurality of predetermined messages to associate with the page;
   storing information relating to a communication mode for the pagor that the pagee can use when returning the page;
   sending the page wirelessly to the pager at a second location;
   waiting a predetermined time period has expired without the pagee responding to the page;
   converting the page to a message away from the second location with a unified messaging system that stores messages associated with devices other than pagers;
   determining the first alert criterion is satisfied;
   upon expiration of the predetermined time period and the determining the first alert criterion is satisfied, activating a first message-waiting indicator associated with the pager;
   determining the second alert criterion is satisfied; and
   upon determining the second alert criterion is satisfied, activating a second indicator associated with the pager.

16. The method for paging from the pagor to the pager as recited in claim 15, further comprising steps of:
   receiving a call from the pagee at the unified messaging system;
   retrieving the information relating to the communication mode for the pagor; and automatically connecting the pagee to the pagor using the communication mode.

17. A computer-readable medium having computer-executable instructions for performing the computer-implementable method for paging from the pagor to the pager as recited in claim 15.

18. The method of claim 15, wherein activating the message-waiting indicator comprises activating one of a light indicator, a sensory indicator, or an auditory indicator.

19. A method for paging from a pagor at a first location to a pager, where the pager is associated with a pagee, the method comprising steps of:
   storing information relating to a communication mode for the pagor that the pagee can use when returning the page;
   sending a page wirelessly to the pager at a second location;
   waiting until a predetermined time period has expired without the pagee responding to the page;
   converting the page to a message away from the second location;
   upon expiration of the predetermined time period, activating a message-waiting indicator associated with the pager;
   receiving a voice message from the pagee;
   converting the voice message to a second format;
   transmitting the message in the second format to the pagor;
   wherein the second format comprises a fax format; and
   wherein transmitting the message to the pagor comprises transmitting a fax.

* * * * *